Figure 1:
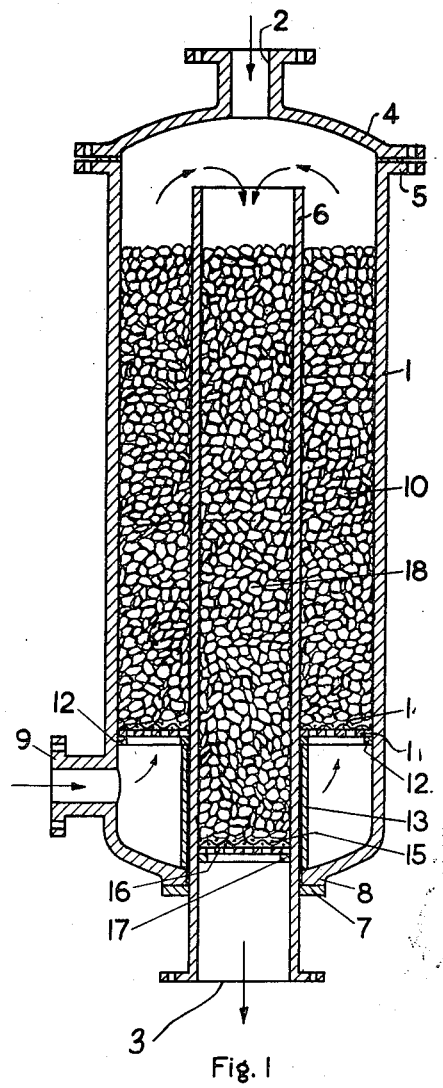

Inventor: Ava J. Johnson
By his Attorney: Millard L Caldwell

Inventor: Ava J. Johnson
By his Attorney:

Patented June 7, 1949

2,472,254

UNITED STATES PATENT OFFICE 2,472,254

APPARATUS AND METHOD FOR CARRYING OUT CATALYTIC REACTIONS

Ava J. Johnson, Oakland, Calif., assignor to Shell Development Company, San Francisco, Calif., a corporation of Delaware Application August 22, 1944, Serial No. 550,647

7 Claims. (Cl. 260—668)

This invention relates to endothermic chemical reactions conducted in the presence of catalysts. It deals with a novel apparatus especially designed so that reactions of this type may be carried out more efficiently and with a new process whereby these reactions may be conducted in a more advantageous and economical manner, particularly with reaction mixtures containing an added product of the reaction.

Considerable difficulty is usually encountered in carrying out endothermic catalytic reactions on a commercial scale due to the sensitivity of the catalysts and reaction to temperature variations coupled with the fact that a uniform temperature is hard to maintain in a large volume of catalyst. Many suggestions for overcoming these difficulties have been made, but no entirely satisfactory procedure has heretofore been known and no apparatus adapted for the most efficient execution of these reactions has been available.

It is an object of the present invention to overcome these and other disadvantages of prior methods of carrying out endothermic catalytic reactions. Another object is to provide an improved apparatus in which reactions of this type may be conducted under more uniform conditions with minimum undesirable side reactions. Still another object is to prolong the effective life of catalysts used in these reactions and to increase the yield and quality of the reaction products. Further objects and advantages of the invention will be apparent from the following more detailed description of the invention.

In order to simplify the description of the invention, its application to the dehydrogenation of hydrocarbons, particularly the production of aromatic hydrocarbons by dehydrogenating naphthenic hydrocarbons, will be used to illustrate the principles involved. This application of the invention has been chosen as an illustrative example not only because of its great commercial importance but also because it involves a reaction which heretofore has presented considerable difficulty in large scale operations. It will be understood, however, that the invention is not limited to this application but that the new apparatus and method may be applied advantageously to a wide variety of other processes involving endothermic reactions. Thus, for example, not only the dehydrogenation of other compounds, such for example as the dehydrogenation of alcohols to produce aldehydes or ketones, but also other endothermic catalytic reactions such as the dehydration of alcohols to olefins, dehydrohalogenation of organic halides, cracking of hydrocarbons, depolymerization of polymers, cyclizing and/or reforming treatments, etc., may be more efficiently and economically carried out according to the invention.

As is known, many of the straight-run petroleum fractions of the nature of gasoline contain appreciable to large concentrations of hydroaromatic naphthenes such as cyclohexane, methyl cyclohexane, etc. These fractions, hereinafter referred to as naphthenic straight-run petroleum fractions, have in general relatively poor antiknock properties and are therefore generally unsuited for blending in high octane gasolines such as are particularly desired for aviation fuels. On the other hand, it is known that aromatic hydrocarbons, such as toluene, are particularly valuable hydrocarbons and furthermore, in view of their excellent anti-knock properties, are desirable constituents of such fuels.

A great deal of effort has been given to the development and perfection of dehydrogenation processes whereby these various straight-run naphthenic fractions may be practically treated on a large scale. Several of such processes have been proposed and one in particular has developed into a practical workable process. This process, of which there are several possible variations, involves the catalytic dehydrogenation of the naphthenic fraction at relatively high temperatures with dehydrogenating metal oxide catalysts. Suitable catalysts comprise the oxides of such metals as Ti, V, Cr, Mn, Mo, W, and U. Of these, the oxides of Cr and/or Mo are generally employed. With catalysts of this type, the processing period is generally from one to a few hours after which carbon and/or heavy tarry material deposited on the catalyst is burned off under carefully controlled conditions and the cycle is repeated. Copending application Serial No. 457,682, filed September 8, 1942 and now abandoned, of which the present application is a continuation-in-part, describes and claims an improved method of operation using a catalyst comprising a sulfide of a metal of the iron group and tungsten sulfide in the presence of an olefinic hydrocarbon and a molar excess of added hydrogen based upon the total hydrocarbon feed. This improvement permits substantial increases in the processing period with resulting economy of operation. The present invention provides a further improvement on such methods as well as a more efficient apparatus for carrying out the process.

According to the present invention the aromatization of naphthenic hydrocarbons is carried out by contacting such hydrocarbon and a substantial molar excess of hydrogen with a catalyst having hydrogenating and dehydrogenating properties and introducing an olefin or other dehydrogenatable compound into the reacting mixture at one or more points along the length of the reaction zone, while it is maintained under conditions conducive to the simultaneous dehydrogenation of the hydroaromatic naphthene and hydrogenation of the olefin or other unsaturated hydrocarbon introduced into the system.

It has already been proposed to carry out simultaneous treatment of a hydrogen donor and hydrogen acceptor. In these known reactions the effect of the hydrogen acceptor is to decrease the partial pressure of hydrogen in the reaction system, thus disturbing the equilibrium between the hydrogen and the hydrogen donor and causing a more complete reaction. In the process of the present invention this is not the case since the process is executed in the presence of a mole excess of hydrogen which is usually recycled through the reaction zone. Any decrease in the partial pressure of hydrogen caused by the hydrogenation reaction is negligible and altogether insufficient to exert any appreciable effect upon the equilibriums which may be present in the system. Furthermore, according to the present invention a new and radically different method of operation is employed which gives greatly improved control of the reaction and makes it possible to maintain a more uniform temperature throughout the reaction zone. This new method of operation is based upon the discovery that when using olefinic hydrocarbons in the aromatization of naphthenes, the hydrogenation of these olefins takes place at a faster rate than the dehydrogenation of the naphthenes involved.

Since the dehydrogenation of hydroaromatic naphthenes is an endothermic reaction there is a decreasing temperature gradient through the reaction zone under normal conditions of operation in which the feed is preheated to about the optimum reaction temperature before being fed to the reaction zone. Such a decreasing temperature gradient results in inefficient conversion, especially toward the exit end of the reaction zone. Heating coils in the catalyst bed and/or reactor jacket improve the operation but greatly increase the cost of the apparatus and also tend to cause local overheating at the walls of the heating elements. Olefins added with the feed so as to supply heat as a result of their simultaneous highly exothermic hydrogenation have the advantage of eliminating such localized overheating. They cannot overcome the undesirable decreasing temperature gradient through the reaction zone, however, because of their faster reaction rate previously mentioned. However, by introducing olefinic feed stock in controlled amounts at an intermediate point or points along the path of flow of the reaction mixture instead of adding it solely with the feed, the exothermic heat of the hydrogenation may be regulated so as to balance the endothermic heat of the slower dehydrogenation reaction at all points in the reaction zone and so obtain a uniformity of reaction conditions not heretofore possible.

A wide variety of different naphthenic hydrocarbon fractions may be a narrow cut such for example as a fraction boiling between about 165° F. and about 185° F. which is suitable for the production of substantially pure benzene or a fraction of 200° F. to about 250° F. boiling range which yields nitration grade toluene by the process of the invention, or a higher boiling narrow fraction such as is suitable for the production of higher boiling aromatic hydrocarbons in a substantially pure form. Where the purpose is to improve the properties of the fraction with no intention of recovering pure products broader fractions boiling up to and including the gasoline end point, for instance 400° F. to 450° F., may be employed. These fractions are usually substantially saturated in character, i. e. they have bromine numbers below about 8; but more highly unsaturated starting materials such, for example, as may be obtained by lightly cracking a naphthenic straight-run naphtha to increase the ratio of olefins to hydroaromatic naphthenes therein, may also be used although it is desirable that such ratio not exceed about 0.5:1 and most preferably the ratio of olefins to hydroaromatic naphthenes in the feed is not greater than about 0.3:1 regardless of the source of such olefins.

Among the unsaturated materials which may be used in the process are, for example, the vaporizable olefin hydrocarbons and hydrocarbon mixtures consisting of or containing appreciable concentrations of such olefins. Although gaseous olefins such as ethylene, propylene, the butylenes, butadiene, etc., may be used, the process may usually be more advantageously effected with the normally liquid olefins. Thus, any of the vaporizable olefinic hydrocarbon fractions such as the usual thermally cracked and/or reformed gasolines, once-run catalytically cracked gasoline stocks, iso-formed stocks, and fractions thereof may be suitably employed. Also, olefinic hydrocarbons having a branched or iso structure are exceptionally suitable. These olefinic hydrocarbons are generally more easily hydrogenated than their corresponding straight chain isomers. Their use therefore generally allows the production of products having a lower bromine number. Furthermore, the branched chain paraffins produced therefrom in the process are generally more valuable products than the corresponding normal paraffins, particularly for motor fuel use. While the various applicable olefinic hydrocarbon fractions may contain considerable amounts of non-olefinic hydrocarbons, it is generally desirable to employ olefinic hydrocarbon fractions which are relatively highly unsaturated, for example those having bromine numbers of 50 or above. The use of such highly olefinic materials allows a considerably higher throughput of the naphthenic fraction per volume of catalyst. The various olefinic polymers produced by the polymerization of one or more of the normally gaseous olefins and boiling in the gasoline boiling range are particularly suitable since they offer a very concentrated source of olefins having highly branched structures. Thus, for example, a particularly suitable olefinic material to be employed is the dimers produced by the polymerization of butylenes. Another advantageous source of olefinic fractions are those which contain appreciable contrations of aromatic hydrocarbons suitable for augmenting the yield of desired aromatics in the process. Among stocks of this type are the highly reformed cracked gasoline stocks such as are produced by subjecting thermally reformed straight-run fractions to a severe thermal reforming treatment, preferably in the presence of added gaseous hydrocarbons. The boiling point or range of the olefinic material may be an important factor in determining the particular material to be used. Thus where the object is to produce pure or substantially pure aromatic hydrocarbons, it is desirable to select an olefinic material which yields hydrogenation products which can be readily separated from the desired aromatic product by fractionation.

A characteristic feature of the process of the invention is that the treatment of the naphthenic hydrocarbon fraction in the presence of the described concentrations of unsaturated hydrocarbons is effected in the presence of appreciable concentrations of added hydrogen. Thus, there is added to the reaction zone a volume of hydrogen (or more preferably a recycle gas rich in hydrogen) at least equivalent to and preferably in excess of the volume of hydrocarbon vapors. Although mole ratios of hydrogen to hydrocarbon as high as 30 to 1 may be suitably employed, it is usually more advantageous to employ ratios between about 3:1 and 12:1, for instance 7:1. When the process is conducted so that there is a net hydrogen consumption and when first starting the process, it is necessary to provide hydrogen or a hydrogen-containing gas from a separate source. However, as will be pointed out more fully hereinafter, the process is usually effected with a net hydrogen production. The hydrogen required in the process is therefore usually produced by the process and is continuously recycled through the reaction zone. The recycle of the hydrogen-containing gas separated from the product is particularly advantageous not only in allowing large ratios of hydrogen to be more economically employed but also in providing a recycle gas of more desirable characteristics. Most hydrocarbon feeds, regardless of their history, contain traces to appreciable amounts of sulfur compounds. In the present process a part at least of these sulfur compounds is reduced to hydrogen sulfide which then concentrates in the recycled gas to a certain extent. The presence of these small amounts of hydrogen sulfide in the recycle gas may increase the activity and life of the catalyst.

During operation of the process small amounts of normally gaseous hydrocarbons such as methane, ethane and propane, formed by side reactions, gradually accumulate in the recycled gas and tend to dilute the hydrogen. In a preferred embodiment of the process of the invention sufficient recycle gas is continuously or intermittently withdrawn to maintain the concentration of hydrogen above 80% by volume, and the composition of the hydrocarbon feed is adjusted to produce a net production of gas equivalent to the amount withdrawn. In this method of operation a maximum amount of olefinic material may be treated without recourse to extraneous hydrogen. If desired, the recycle gas withdrawn from the system may be treated by known means (for instance, by scrubbing or high temperature cracking) to remove hydrocarbon diluents and the hydrogen then returned to the reaction system.

The preferred catalysts for this application of the process of the invention are intimate mixtures of tungsten sulfide with one or more sulfides of metals of the iron group having a mole ratio of iron, cobalt and/or nickel sulfide to tungsten sulfide between about 0.4:1 and 2.5:1, preferably nickel sulfide and tungsten sulfide in a mole ratio of about 2:1 as described in the copending applications previously referred to. However, other catalysts capable of promoting simultaneous hydrogenation and dehydrogenation may also be used as previously indicated, molybdenum sulfide being particularly useful for this purpose.

The optimum amount of olefinic material to introduce into the reaction depends upon several factors such as the degree of unsaturation of the olefinic material employed, the concentration of hydroaromatic naphthene hydrocarbons in the fraction being treated, the thermal efficiency of the reactor, the amount of fixed gases such as methane produced in the process, etc., and can therefore only be stated to lie within certain relatively broad limits. One of the most important considerations in this connection is that the amount of olefinic hydrocarbon should be adjusted to give a favorable heat balance in the process. If the reacted olefins and hydroaromatic naphthenes are in a mole ratio of about 1.8:1 (this ratio varies somewhat depending upon the particular olefin and hydroaromatic naphthene), an overall reaction results which is neither endothermic nor exothermic. By employing a ratio of olefinic material slightly higher than this the process may be made just sufficiently exothermic to counterbalance any heat losses from the reactor. When employing material relatively concentrated in olefins and properly spacing the points of olefin introduction so that a uniform reaction temperature is assured, the beneficial effect of the olefin on the reaction is roughly proportional to the amount used up to a ratio of about 3 moles of olefin per mole of hydroaromatic naphthene fed. Although the process may be operated at higher ratios at which there is a net consumption of hydrogen, it is generally more economical to employ ratios at which there is a net production of hydrogen. Therefore, as a general rule, mole ratios of olefin to hydroaromatic naphthene of from about 1.8:1 to about 2.8:1 are preferred. Within these limits a ratio may usually be chosen so that, with a small withdrawal of recycle gas to prevent dilution of the recycled hydrogen by fixed gases such as methane, etc., to below about 80% by volume, both the heat balance and hydrogen production are favorable. However, when the concentration of hydroaromatic naphthenes in the fraction being treated is relatively low, for instance less than about 15 mole per cent, smaller ratios, for example down to about one mole of olefin per mole of hydroaromatic naphthene, may be more desirable. Also, when the degree of unsaturation of the olefinic material used is relatively low, it may be advantageous to use somewhat lower ratios of olefin to hydroaromatic hydrocarbons, e. g. between about 0.5:1 and about 2:1, in order to avoid excessive lowering of the throughput of the naphthenic fraction.

Whatever overall ratio of olefin to hydroaromatic hydrocarbon is used, it is important, as previously pointed out, that all of the olefin be not introduced with the feed but that at least a part be added at one or more intermediate points along the path of flow of the reactants through the reaction zone. The number of points at which it will be most advantageous to add olefin, and relative amounts of the olefinic feed which should be added at such different points may vary with the type of reactor used but in any given case can be readily adjusted in accordance with the invention so as to give substantially uniform reaction conditions throughout the reaction zone.

The process may be carried out in any of the reactors conventionally employed for effecting other dehydrogenation and hydrogenation reactions if these reactors are suitably modified so that the unsaturated hydrocarbon may be added at an intermediate point or points in the reaction. Thus, for example, the catalyst may be employed in the form of a finely divided powder which may be circulated through the reaction zone concurrent or countercurrent to the reactant vapors while an unsaturated readily hydrogenatable hydrocarbon is admitted at one or more points in said zone other than with the feed. Alternatively the catalyst may be disposed in a fixed, or a continuously or intermittently renewed, bed through which the aromatic naphthene and hydrogen, with or without a small amount of olefin, is passed while additional olefin is injected further along the path of the reactants in the reaction zone. However, in order to realize the full advantages of the new method of operation it should be carried out in the improved reactor of the invention shown as a sectional elevation of one simpler form of a chamber type reactor embodying the features of this phase of the invention of Figure 1 of the accompanying drawing which is not to any exact or relative scale.

In the form shown in Figure 1 the reactor of the invention comprises a substantially cylindrical outer shell 1, having its ends closed except for ports 2 and 3. For ease in charging, one or both end closures may advantageously be removable. Thus, a removable head 4, having a flanged inlet 2, may be secured by suitable bolts, not illustrated, to flange 5. A tube 6, of heat conducting material, having a flange 7, attached thereto by welding or in any other suitable manner, is secured to flange 8 of shell 1 by bolts, not illustrated. Shell 1 is also provided with another flanged inlet 9. The annular space between shell 1 and central tube 6 may be substantially filled with a bed of suitable pelleted or granular contact material indicated by numeral 10. The catalyst bed rests, in the case here illustrated, on a perforate, annular plate 11 supported adjacent the lower end of shell 1 and preferably above flanged inlet 9 by suitable clips 12 attached at special points to the inner surface of shell 1. A sleeve 13 around tube 6 may be used to assist in maintaining plate 11 in position. A suitable screen 14 may, when desired, be provided over the upper surface of perforate plate 11. Central tube 6 is likewise substantially filled with a bed of granular contact material 18 supported in a similar way by a screen 15 and perforate plate 16 held in place by spaced clips 17 attached to the inner wall of tube 6. Continuous rings or the like attached to the inner walls of tubes 1 and 6 may be substituted, if desired, for clips 12 and 17. Perforate plate 16 is preferably located at a point in tube 6 below flanged inlet 9 of shell 1. Tube 6 may advantageously be provided with fins or other suitable projections, not illustrated, on its inner and outer surfaces, which fins not only may assist in promoting the desired heat transfer between the different parts of the reaction zone formed thereby but also may aid in supporting the catalyst and in improving the contact of the reactants with the catalyst by prolonging the path of flow through the catalyst bed.

When carrying out simultaneous endothermic and exothermic catalytic reactions in the apparatus illustrated in Figure 1, the endothermic reactant, with or without a part of the relatively faster reacting exothermic reactant, is preferably introduced via flanged inlet 9 and passes over the catalyst in the annular space between shell 1 and tube 6 which constitutes a first reaction zone preferably maintained under conditions such that there is a net absorption of heat in the reaction or reactions taking place therein. Tube 6 extends to a point short of the closure 4 of shell 1 so that a path is provided whereby the fluid reaction mixture leaving the first reaction zone passes into the central tube. A reactant capable of undergoing exothermic reaction with a component of said reaction mixture is introduced by inlet 2 and passes together with said mixture through the catalyst bed in the central tube which constitutes a second reaction zone in which sufficient heat is generated to supply heat not only for the endothermic reaction taking place simultaneously therein but also for at least a part of the endothermic heat of reaction required in the surrounding annular space. It is also feasible, and in some cases desirable, to reverse the points of entry of the reactants so that the reaction carried out in the annular first reaction zone is predominantly exothermic instead of endothermic while that effected within the central tube has a net endothermic heat of reaction. Often periodic reversals of flow of this kind are advantageous during operation because of the beneficial effect they may have on the catalyst. In any case, of course, both types of reaction may be conducted simultaneously in both of the reaction zones or one such zone may be used for one type of reaction only. In designing the new reactors, the different reaction zones are preferably proportioned in accordance with the volume of reactants which they will handle so as to give a suitable rate of flow throughout the system. Thus, due to the introduction of olefin via inlet 2 of the apparatus shown in Figure 1, it will usually be desirable to construct the unit so as to provide a greater area inside the interior tube 6 than in the annular chamber containing catalyst 10. For the same reason, in the form of apparatus illustrated in Figure 2, annular chamber 13 will usually have a greater cross-sectional area than either of the other parts of the reaction zone.

This type of reactor has important advantages over the forms heretofore used for carrying out catalytic reactions. It not only permits the use of large beds of catalyst without danger of excessive variations in temperature between different parts of the bed but also it makes more efficient use of the exothermic heat of reaction produced in the process by transferring it to an adjacent reaction zone in which it may be efficiently utilized. In fact, by proper adjustment of the relative amounts of endothermic and exothermic reactants added at inlets 2 and 9, the simultaneous reactions may be carried out without substantial loss or generation of heat in the reaction, particularly when, as is preferred, the reactor is well insulated, and the only heating needed, if any, is that required to bring the reactants to the necessary reaction temperature. This is accomplished in the present reactor without the usual difficulties due to differences in temperature in different parts of the reactor. These improvements lead to material increases in yield of desirable products and substantial prolongation of the operating cycle of the catalyst which greatly reduce the cost of operation. A further advantage of the new apparatus is its simplicity of design which makes fabrication easy and construction inexpensive. The new design also is of advantage during the regeneration period of the cycle since the heat transfer between the different catalyst zones makes for more uniform temperatures during this operation and the inlet provided for the second reaction zone makes it possible to introduce regenerating gases and/or diluents therefor, such as steam, at more than one point along the flow of the gases so that more accurate control of the regeneration temperature is achieved and danger of catalyst damage is minimized.

Since the time of catalyst regeneration is usually proportional to the length of the catalyst bed, regeneration in the apparatus of the invention is much faster than in conventional reactors because the regeneration is carried out with catalyst beds of shorter length operated in parallel. Furthermore, during the burning period of regeneration a plurality of flame fronts are used and these move in different directions tending to maintain a more uniform temperature.

Figure 2:
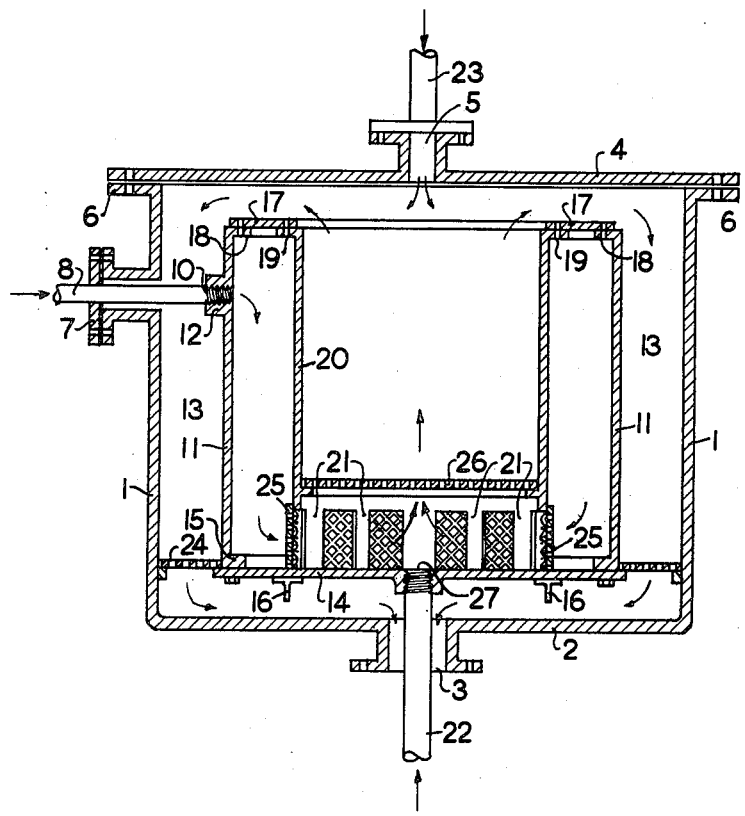

The form of the new reactor is not limited to that described in the foregoing specific example, however, since not only may the method of construction of reactors of this type be varied but also the type may be considerably modified without departing from the principles of the invention. For example, more than one partitioning interior tube may be employed so that the reactants make more than two passes when going through the reactor. Figure 2 of the drawing shows in sectional elevation one such modified reactor which has special advantages. In the form illustrated in Figure 2 the reactor comprises an outer shell 1, formed with an integral bottom closure 2 having a flanged outlet port 3. A removable top closure 4 having an inlet port 5 is attached by bolts not illustrated to peripheral flange 6 of shell 1. Shell 1 is also provided with a flanged inlet port 7 through which a pipe 8 passes and leads through a port 10 in an inner partitioning member 11 which is preferably tubular in form and concentric with shell 1. Inlet pipe 8 is securely attached to partitioning member 11, preferably removably, as by screwing a threaded end into a threaded flange 12, so that feed stock introduced thereby will not escape into the annular chamber 13 formed by shell 1 and member 11. Member 11 is provided with a bottom closure 14 which may advantageously be removably attached thereto by bolts, not shown, joined to peripheral flange 15 or in any other suitable manner. Bottom closure 14 contains a port 27 through which another inlet pipe 22 may pass and be attached in the same manner as pipe 8. Brackets 16 attached to closure 14 or to closure 2 or other types of spacing means whether attached or not are used to support closure 14 and partitioning member 11 in spaced relation to bottom closure 2 and provide a passage from annular chamber 13 to outlet 3. These brackets or other means, not illustrated, may be constructed, as with arms or the like abutting on shell 1, so as to maintain member 11 in concentric position with respect to shell 1. Member 11 has an upper annular closure 17 attached by bolts, not shown, to a flange 18. Closure 17 is also attached by bolts, not shown, to a flange 19 of a central tube 20 which is thus maintained concentric with member 11 and shell 1. Central tube 20 and member 11 thus form an annular chamber in heat transfer relationship with both the interior of tube 20 and the annular chamber formed by shell 1 and member 11. Positioning members 21, which may be integral with tube 20 or fastened thereto in any suitable manner, maintain tube 20 in spaced relation to closure 14 on which the tube is thereby supported and provide a passageway through which reactants from the annular chamber between member 11 and tube 20 may enter the latter in admixture with fluids introduced by pipe 22 through port 27. Tube 20 and partitioning member 11 are made sufficiently shorter than shell 1 so that a path is provided whereby reactants from the interior of tube 20 may pass between closures 4 and 17 into the annular chamber between shell 1 and member 11 after admixture with a reactant introduced by pipe 23 through port 5. The entire reaction space within shell 1 may be filled with suitable catalyst for the reaction involved in which case it is generally desirable to provide inlet pipes 8, 22 and 23 with perforated caps, not shown, preferably conical in form to promote better distribution of the reactants and to cover outlet port 3 with a screen or other means for preventing loss of catalyst. Better mixing of the reactants is usually achieved, however, by providing other catalyst supporting means (indicated in Figure 2 by the numerals 24, 25 and 26) which may be of the same type as those described in connection with Figure 1 or of any other suitable form, and by incompletely filling the passage way between the central reaction zone and that forming the outer annular chamber.

In a reactor of the type shown in Figure 1, the aromatization of hydroaromatic naphthenes such, for example, as a mtehylcyclopentane-containing straight-run fraction is preferably carried out as follows:

The naphthenic fraction, together with from three to twelve moles of hydrogen per mole of hydrocarbon and about 0.5 to 1.0 mole of olefin, such as diisobutylene, per mole of hydroaromatic naphthene in the feed, is preheated to about 400° C. to 500° C. under a pressure of 5 to 75 atmospheres and fed through inlet 9. The reaction mixture is fed at a rate corresponding to a liquid hourly space velocity of total hydrocarbon of 0.3 to 5 based upon the total volume of catalyst in the reactor and passes first through the outer annular reaction space formed by shell 1 and central tube 6. About 1.0 to 2.0 moles of olefin per mole of hydroaromatic naphthene in the feed are continuously introduced via inlet 2 so as to provide an overall addition of about 1.8 to 2.8 moles on the same basis before the reaction mixture passes down through the central tube and is discharged via outlet 3. Under these conditions substantially uniform reaction at a temperature within the range of about 425° C. to 525° C. may be readily maintained throughout the reactor and with an active tungsten sulfide-nickel sulfide catalyst, for example, conversion efficiencies of about 90% may be maintained for periods in excess of 1000 hours without regeneration.

Equally good results are obtained with the reactor of Figure 2 when using essentially similar conditions except that only about one-tenth to about one-fourth of the total added olefin is introduced with the feed and the remainder is added in equal amounts through inlet pipes 22 and 23.

It will thus be seen that the apparatus and new reaction method of the invention offer many advantages over prior practice in this field, particularly with respect to economy of construction and operation and in efficiency of conversion of the reactants treated. The new apparatus and method are capable of wide variation not only with relation to the endothermic and exothermic reactants which may be used but also in regard to the methods and conditions of reaction which may be employed. Thus, for example, while the use of the new apparatus for carrying out the new method has been emphasized because of the outstanding advantages which may be realized thereby, it is also feasible to employ more conventional types of reactors such, for instance, as tray type catalyst towers having means for introducing between one or more trays a reactant capable of undergoing exothermic reaction with a product of endothermic reaction of another compound which is being passed successively through such trays together with an added excess of such reaction product. Also, it will be understood that in some cases it will be more advanatgeous to introduce the endothermic reactant at intermediate points along the path of flow of an exothermic reactant or reactants through the system. Instead of the same catalyst throughout the reaction, different catalysts may be used in different parts thereof. Still other variations in the process and apparatus may be made within the scope of the invention, which is not limited to the details described by way of example nor by any theory advanced in explanation of the improved results obtained.

I claim as my invention:

1. A method of producing toluene which comprises subjecting a mixture of methyl cyclohexane, between about 3 and 12 moles of hydrogen, and 0.1 and 0.5 mole of diisobutylene per mole of hydroaromatic naphthene present, which mixture also contains a small amount of a sulfur compound, to partial dehydrogenation in the presence of a catalytic mixture of tungsten sulfide with a sulfide of a metal of the iron group at a temperature of 400° C. to 525° C. under a pressure of 5 to 75 atmospheres at which a net absorption of heat takes place in the reaction, adding sufficient additional diisobutylene to the reaction mixture in substantially equal amounts at a plurality of points along the path of flow of the mixture to make the overall molar ratio of diisobueylene to starting hydroaromatic naphthene between 1.8:1 and 2.8:1, completing the dehydrogenation in the presence of the same catalyst and in indirect heat exchange with the first said partial dehydrogenation under conditions at which sufficient heat is evolved in the hydrogenation of the added diisobuetylene to supply heat not only for the completion of the dehydrogenation but also for the first said partial dehydrogenation and a net production of hydrogen is obtained, separating from the gaseous components of the final reaction mixture hydrogen of at least 80% purity containing hydrogen sulfide formed in the reaction, recycling said hydrogen to the first said partial dehydrogenation and periodically reversing the flow of reactants through the catalyst system so that the first said partial dehydrogenation is carried out with catalyts previously used in the said completion of the dehydrogenation and vice versa, whereby prolonged operating cycles of the catalyst under uniform reaction conditions are obtained.

2. A method of producing aromatic hydrocarbons by dehydrogenating hydroaromatic naphthenic hydrocarbons which comprises subjecting a hydroaromatic naphthenic hydrocarbon to partial dehydrogenation by contacting a mixture of said hydroaromatic naphthenic hydrocarbon, a molar excess of hydrogen, and between 0.1 and 0.3 mole of a normally liquid olefin based upon the naphthenic hydrocarbon present with a catalyst having hydrogenating and dehydrogenating properties in a first reaction zone under conditions of reaction at which a net absorption of heat takes place, adding additional olefin to the effluent of said reaction zone in an amount such that the total molar ratio of olefin used to starting naphthenic hydrocarbon employed is between 1.8:1 and 2.8:1, completing the dehydrogenation in a second reaction zone in the presence of the same catalyst in indirect heat exchange relationship with the first reaction zone whereby an increasing temperature gradient is maintained in the flowing stream of reaction mixture and a net production of hydrogen is obtained, separating from the gaseous components of the final reaction mixture hydrogen of at least 80% purity and recycling said hydrogen to the first reaction zone.

3. A method of simultaneously carrying out the dehydrogenation and hydrogenation of hydrocarbons which comprises passing vapors of a dehydrogenatable saturated hydrocarbon together with at least three moles of hydrogen and between 0.1 and 1.0 mole of an unsaturated hydrocarbon based on said dehydrogenatable hydrocarbon into contact with a catalyst capable of promoting dehydrogenation of the saturated hydrocarbon and hydrogenation of the unsaturated hydrocarbon in a first reaction zone under temperature and pressure conditions at which partial dehydrogenation of said saturated hydrocarbon and hydrogenation of said unsaturated hydrocarbon takes place with a net absorption of heat in the overall reaction, adding an additional amount of said unsaturated hydrocarbon between about 0.5 and 2.0 moles of unsaturated hydrocarbon per mole of saturated hydrocarbon present, completing the dehydrogenation in a second reaction zone in the presence of a catalyst having hydrogenating and dehydrogenating properties in indirect heat exchange relationship with the first reaction zone whereby an increasing temperature gradient is maintained in the flowing stream of reaction mixture and a net production of hydrogen is obtained, separating from the gaseous components of the final reaction mixture hydrogen produced in the reaction in excess of that initially fed and recycling the remaining hydrogen to the first said reaction zone.

4. A method of simultaneously carrying out endothermic and exothermic catalytic reactions of hydrocarbons which comprises passing a hydrocarbon in the fluid state in a flowing stream through a first reaction zone containing a catalyst capable of promoting an endothermic reaction of said hydrocarbon under the reaction conditions, which catalyst normally has a decreasing temperature gradient in the reaction, feeding into said reaction zone a substantial molar excess based upon said hydrocarbon of a product of said endothermic reaction of said hydrocarbon and a minor amount based upon said starting hydrocarbon of another hydrocarbon capable of reacting exothermally with said reaction product under the reaction conditions, maintaining rates of flows of said reactants at which there is a net absorption of heat in the overall reaction, adding a further amount of said other hydrocarbon to the reaction products and feeding the mixture to a second reaction zone in the presence of the same catalyst in indirect heat exchange relationship with the first reaction zone whereby an increasing temperature gradient is maintained in the flowing stream of reaction mixture and a net production of the product of said endothermic reaction is obtained, separating from the final mixture an amount of said product equal to that initially used in the reaction and recycling said product to the first reaction zone.

5. A method of simultaneously carrying out endothermic and exothermic catalytic reactions which comprises feeding a chemical compound in the fluid state at reaction temperature to a first reaction zone containing a catalyst under conditions at which said compound undergoes an endothermic reaction normally resulting in a decreasing temperature gradient through the reaction zone, also feeding into said reaction zone a substantial molar excess, based upon said compound, of a product of said endothermic reaction, and a minor amount, based upon said chemical compound, of another chemical capable of reacting exothermally with said reaction product under the reaction conditions, maintaining rates of flows of said reactants at which there is a net absorption of heat in the overall reaction, adding a further amount of said other chemical to the reaction products and feeding the mixture to a second reaction zone in the presence of the same catalyst in indirect heat exchange relationship with the first reaction zone whereby an increasing temperature gradient is maintained in the flowing stream of reaction mixture and a net production of the product of said endothermic reaction is obtained, separating from the final mixture an amount of said product equal to that initially used in the reaction and recycling said product to the first reaction zone.

6. A reactor for carrying out catalytic reactions comprising an outer cylindrical shell formed with an integral bottom having an outlet port therein, a removable top closure for said shell having an inlet port therein, a heat conducting tubular partitioning member within said shell, concentric therewith and terminating at a point sufficiently short of said removable top closure to provide a passage way from the inlet port in said top closure to a first annular space formed by said partitioning member and shell, a bottom closure for said partitioning member having an inlet pipe attached thereto and extending through the outlet port in the shell bottom, said pipe being sufficiently smaller in diameter than said outlet port to leave a fluid passage way in the latter, means for supporting the bottom closure of the partitioning member in spaced relation to the shell bottom to provide a passage way from the annular space between said partitioning member and the shell to the outlet port, a heat conducting central tube within said partitioning member and concentric therewith, an annular closure attached in fluid tight relationship to the upper part of said central tube and said partitioning member, means for conducting fluid through the outer cylindrical shell into a second annular space between the central tube and the partitioning member without escaping into the said first annular space, flow communicating means between said second annular space and the interior of said central tube, means in said central tube at a level above said flow communicating means adapted to hold catalytic material and means adapted to hold catalytic material within said first and second annular spaces.

7. A reactor for carrying out catalytic reactions comprising an outer shell, a bottom closure for said shell having an outlet port therein, a top closure for said shell having an inlet port therein, a heat conducting partitioning member within said shell forming a first reaction space between said partitioning member and shell and terminating at a point sufficiently short of said top closure to provide a passageway from the inlet port in said top closure to said first reaction space formed by said partitioning member and shell, a bottom closure for said partitioning member having an inlet pipe attached thereto and communicating exteriorly of the outer shell, means for supporting the bottom closure of the partitioning member in spaced relation to the shell bottom to provide a passageway from the said first reaction space between said partitioning member and the shell to said outlet port in the bottom closure of said shell, a heat conducting central member forming a second reaction space between said central member and the aforesaid partitioning member and enclosing a third reaction space, a closure attached in fluid tight relationship to the upper part of said central member and to said partitioning member, means for conducting fluid through the outer shell into said second reaction space between the central member and partitioning member without escaping into the said first reaction space, flow communicating means between said second reaction space and said third reaction space, means in the interior of the heat conducting central member adapted to hold catalytic material therein, and means adapted to hold catalytic material within said first and second reaction spaces.

AVA J. JOHNSON.

REFERENCES CITED

The following references are of record in the file of this patent:

UNITED STATES PATENTS

| Number | Name | Date |
| --- | --- | --- |
| 1,386,760 | Bosch | Aug. 9, 1921 |
| 1,991,353 | Plummer | Feb. 12, 1935 |
| 2,127,561 | Herrmann | Aug. 23, 1938 |
| 2,161,247 | Dearborn | June 6, 1939 |
| 2,167,339 | Sweeney | July 25, 1939 |
| 2,238,851 | Pier et al. | Apr. 15, 1941 |
| 2,263,363 | Menshih | Nov. 18, 1941 |
| 2,284,463 | Burk et al. | May 26, 1942 |
| 2,290,211 | Schaad | July 21, 1942 |
| 2,302,328 | Kelly | Nov. 17, 1942 |
| 2,328,756 | Thomas | Sept. 7, 1943 |
| 2,337,684 | Scheineman | Dec. 28, 1943 |
| 2,378,342 | Voorhees | June 12, 1945 |

FOREIGN PATENTS

| Number | Country | Date |
| --- | --- | --- |
| 543,838 | Great Britain | Mar. 16, 1942 |

OTHER REFERENCES

Natelson: "Styrene and Metastyrene," Ind. and Eng. Chem., vol. 25, page 1392 (Dec. 1933).